UNITED STATES PATENT OFFICE.

ELIAS L. ELLIOTT, OF NEW YORK, N. Y., ASSIGNOR, BY MESNE ASSIGNMENTS, TO MACBETH-EVANS GLASS COMPANY, OF PITTSBURGH, PENNSYLVANIA, A CORPORATION OF PENNSYLVANIA.

GLASS BATCH OR MIXTURE.

1,192,048.      Specification of Letters Patent.      Patented July 25, 1916.

No Drawing.      Application filed July 17, 1914. Serial No. 851,611.

*To all whom it may concern:*

Be it known that I, ELIAS L. ELLIOTT, residing at New York, in the county of New York and State of New York, a citizen of the United States, have invented or discovered certain new and useful Improvements in Glass Batches or Mixtures, of which improvements the following is a specification.

This invention relates to an improved form of glass, having properties which give it special value for use in diffusing and distributing artificial light. These new and valuable properties are secured by the use of certain ingredients in the raw materials, or "batch" of which the glass is formed by the usual process of fusion.

A brief statement of the chemical and physical principles involved in glass making will facilitate a clear comprehension of the improvements which constitute my invention.

Glass, as known in commerce, is a mixture of silicates, holding more or less silica in solid solution, with the frequent presence of metals or elements in colloidal suspension.

The chief physical characteristics of clear or crystal glass are transparency, hardness, brittleness, and elasticity. Its chief chemical characteristic is resistance to solvents.

Glass loses its transparency and assumes a white translucency under any one or more of the following conditions: (A)—when one or both surfaces are roughened, causing diffuse reflection therefrom: (B)—when minute globules or particles of air, gas, transparent crystals, or glass of different refractive index are distributed throughout the mass: (C)—when particles of white matter more or less opaque are scattered through the mass. Glass known in commerce as "opal", "opalescent" and "alabaster", and used for the diffusion of artificial light, belong to class B, and are produced by the use of phosphates, or fluorids, in the "batch". It is well established that the minute particles above mentioned as producing glass "B" are ultra-microscopic in size, being comparable to wave lengths of light in their dimensions. This is proven by the fact that glass of this type shows selective absorption of transmitted light, the shorter waves being usually absorbed, thereby giving an orange color to the glass when thus viewed. This phenomenon is known in the industry as "firing". Such display of color is objectionable, but can be prevented in this type of glass only by increasing its density or opacity, *i. e.*, reducing the translucency of the glass, which is objectionable on account of greater absorption of light and consequent less efficiency. This type of glass also possesses a characteristic milky-white, glassy appearance by reflected light, strongly resembling glazed porcelain; whence it was formerly sold as "milk-china", is called "Milch-glass" in German, and is still frequently referred to as "porcelain" when in the form of a lamp shade.

In my improved glass I secure the following advantages: (A)—complete elimination of "firing" due to selective absorption: (B)—substantially perfect diffusion of transmitted light with minimum absorption: (C)—an apparent texture and color, both by transmitted and reflected light, almost exactly similar to natural alabaster, and free from the peculiar milk-glass quality. Such glass is preëminently suited to the production of bowls and plaques now largely used for semi-indirect lighting, and is also equally valuable for light-diffusing globes and shades.

I am aware that a glass resembling mine has been commercially produced, and is the subject of Letters Patent No. 1,097,600 dated May 19th, 1914; but this glass is objectionable for some purposes, in that visibly large particles or specks of a white opaque matter are scattered through it, which show as black spots and specks when the glass is seen by transmitted light. These specks are not present in glass produced from my improved batch. The glass above referred to also requires careful manipulation in the making, as set forth in the patent, whereas my batch requires no special treatment in the fusion.

I secure the peculiar qualities of my glass by a combination of methods B and C, hereinbefore described, *i. e.*, the matrix of clear glass has suspended therein glass particles of both ultra-microscopic and microscopic size. The ultra-microscopic particles change the glass matrix from a transparent to a translucent condition, while the microscopic particles prevent the selective absorption of the rays; the two effects combining to produce the alabaster appearance.

To produce the ultra-microscopic particles I use aluminum and fluorin compounds in certain proportions as hereinafter specified.

To produce the microscopic particles I use a sulfate. I have found that if sulfates be added to a batch adapted to form clear glass, the resultant product closely resembles the mineral known as moonstone. It is believed that the sulfate is not decomposed by the silica and alkalis forming such batch, and that the fine particles thereof are simply held in suspension, producing the effect above stated. If, now, the density, or opacity, of such glass be slightly increased by the addition of the ultra-microscopic particles producible by the use of aluminum and fluorin compounds in certain proportions, the glass takes on all the desirable properties before enumerated.

I have found the following batch to give good results: (1) sand 700, soda 200, pearlash 100, niter 50, antimony 10. To which I add: (2) feldspar 200, cryolite 55, aluminum sulfate 15.

Any batch capable of producing clear or colorless glass may be used in lieu of formula No. 1, as my improvement consists in adding to a batch adapted to produce clear or crystal glass, a sulfate, an aluminum compound and a fluorin compound.

It will be understood that the invention is not limited as regards the relative proportions of the sulfate and the aluminum and fluorin compounds, as good results can be obtained when the proportions of such ingredients vary widely from those stated. But it is preferred that the aluminum and fluorin compounds should be added in such relative proportions that the weight of the element fluorin in the batch should not be less than that of the element aluminum.

Any sulfate which will not be affected by or affect the silica and alkalis of the batch may be employed. Good results can be obtained in the use of sulfates of aluminum, magnesium, calcium, barium, strontium, lead, zinc, and other metals which will not produce color in the glass.

The sulfates may be added in any desired proportions from one per cent. (1%) up of the total weight of the batch, since any excess will simply float on the surface of the molten glass as before stated.

It is old in the manufacture of opal glass to add barium sulfate or barium carbonate to the batch in order to increase the index of refraction, and thereby the brilliancy of the resulting glass, but this effect cannot be produced in using barium sulfate unless the latter is decomposed by the use of a reducing agent, as charcoal. It is characteristic of my improvement that the sulfate is not reduced but remains in a state of suspension furnishing the microscopic particles found in the resulting glass.

I claim herein as my invention:

1. A batch for producing glass consisting of a foundation mixture capable when fused of producing a substantially colorless glass, combined with a sulfate which will not affect or be affected by silica and alkalis in the batch, and aluminum and fluorin compounds in such proportions that the weight of the element fluorin is not materially less than the weight of the element aluminum and free from any material tending to decompose the sulfate at the working temperature of a glass furnace.

2. A batch for producing glass consisting of a foundation mixture adapted to produce colorless glass, to which is added compounds containing a sulfate, which will not affect or be affected by silica and alkalis in the batch, compounds containing aluminum, and compounds containing fluorin, the total aluminum and fluorin contents being approximately equal in quantity and the sulfate being in such quantity as to leave suspended in the final melted mass undecomposed particles of sulfate, substantially as described.

In testimony whereof, I have hereunto set my hand.

ELIAS L. ELLIOTT.

Witnesses:
G. G. TRILL,
THOS. B. JOYCE.